2,241,213

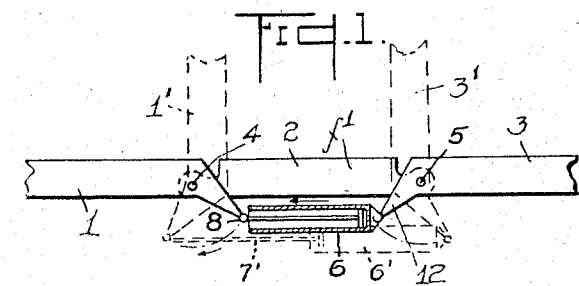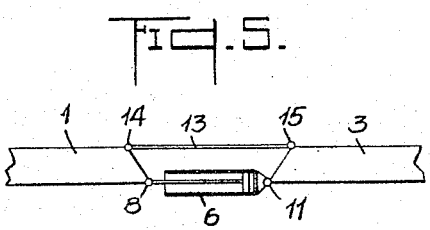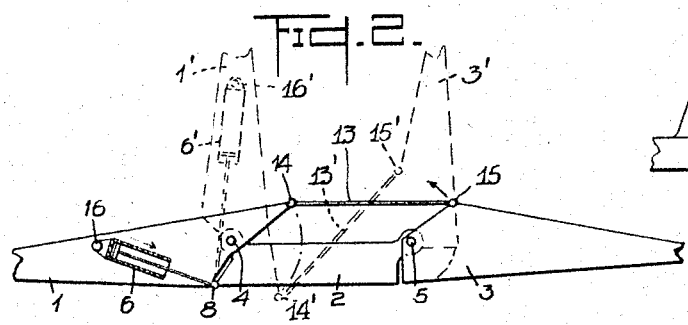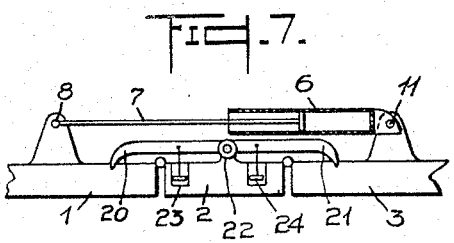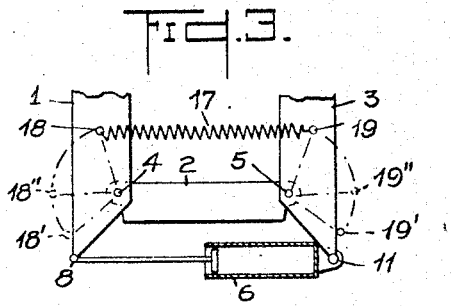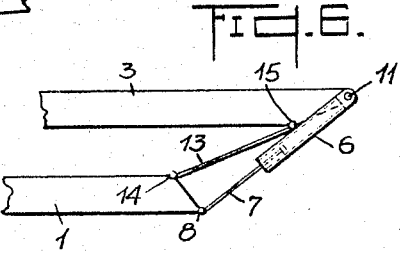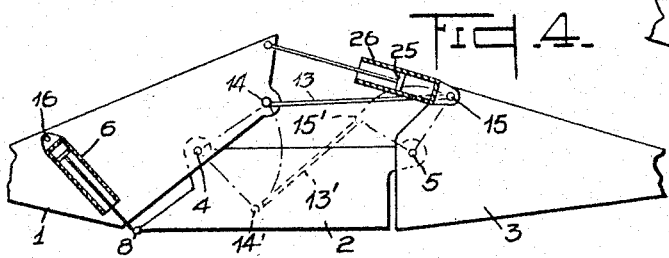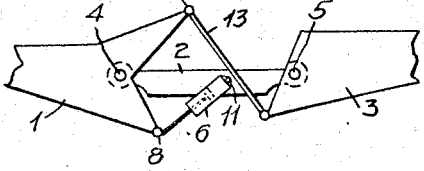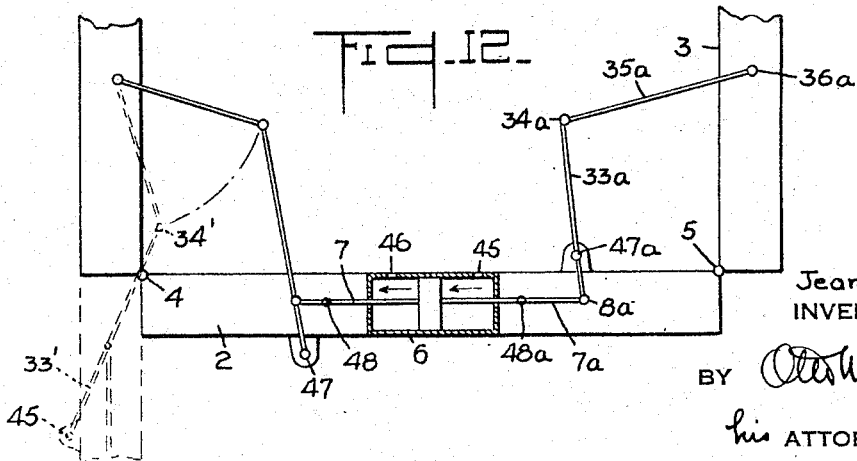
Jean Mercier
INVENTOR May 6, 1941.  J. MERCIER  2,241,213
JOINTED MECHANISM, CHIEFLY ADAPTED FOR USE
UPON UNDERCARRIAGES OF AIRCRAFT
Filed Feb. 9, 1938   2 Sheets-Sheet 2
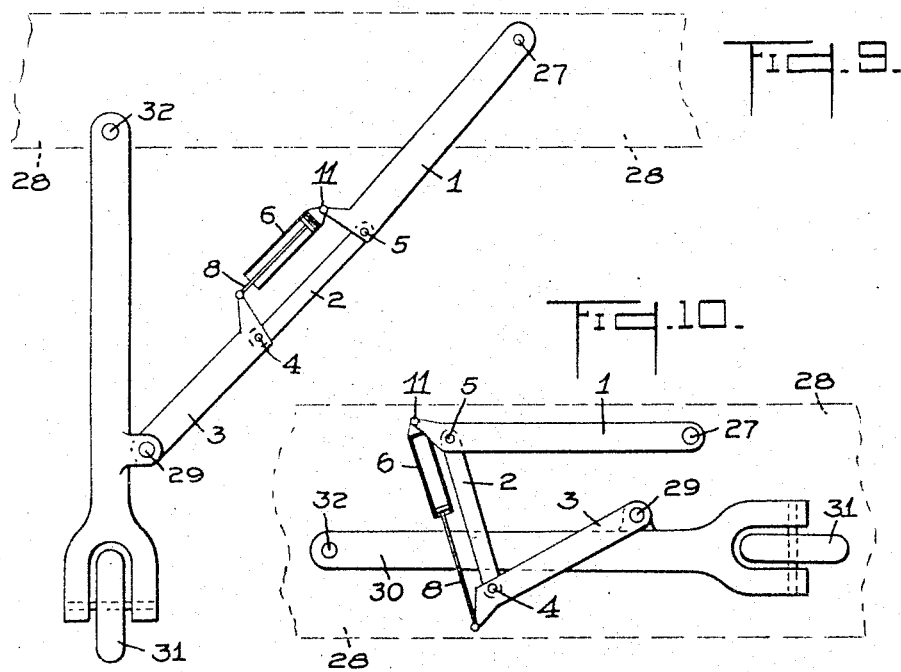
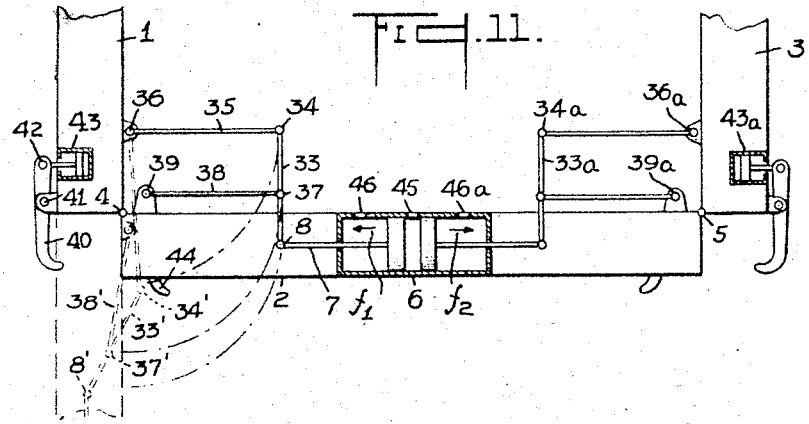
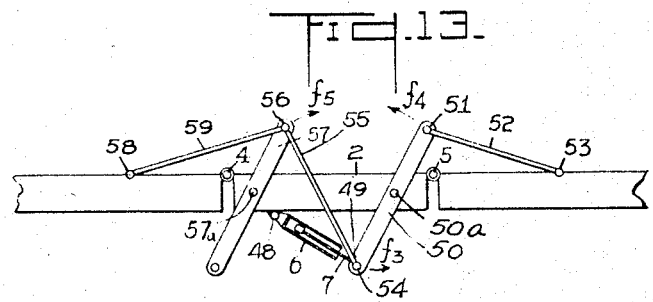
Jean Mercier
INVENTOR
BY
his ATTORNEY Patented May 6, 1941

UNITED STATES PATENT OFFICE 2,241,213

JOINTED MECHANISM, CHIEFLY ADAPTED FOR USE UPON UNDERCARRIAGES OF AIRCRAFT

Jean Mercier, Neuilly-sur-Seine, France

Application February 9, 1938, Serial No. 189,526
In Belgium February 13, 1937

6 Claims. (Cl. 244—102)

The present invention relates to jointed mechanisms as are chiefly adapted for use as pivoted frames or struts upon retractable undercarriages of aircraft or the like.

According to an essential feature of the invention, the mechanism includes a jack which is mounted on the jointed device and controls the deformations thereof, and consists of three or more members pivotally connected together about at least two axes, the said jack controlling, by direct action, the relative movements of at least two of said pivoted members.

Further characteristics will result from the following description.

The accompanying drawings, given merely by way of example, illustrate various embodiments of the mechanism according to the invention.

Fig. 1 shows in elevation a pivoted frame or strut provided with the said mechanism, in which the operating jack is interposed between two non-adjacent members of the mechanism;

Fig. 2 is a similar view of a modification in which the operating jack is mounted upon one of the movable members of the mechanism;

Fig. 3 shows in elevation a strut similar to that of Fig. 1, provided with a folding and locking device;

Fig. 4 shows in elevation a pivoted frame similar to that of Fig. 2, provided with a shock-absorber;

Figs. 5 and 6 are elevational views, in the folded and unfolded positions respectively, of a pivoted frame which is particularly adapted for use in the wing of aircraft and which has a relatively reduced height in the folded state;

Fig. 7 is an elevational view of a special locking device;

Fig. 8 shows in elevation another modification of said strut;

Figs. 9 and 10 are respectively diagrammatic elevational and plan views showing the mounting of a mechanism according to the invention, upon a retractable undercarriage, Fig. 9 showing the mechanism in the unfolded position, and Fig. 10 in the folded position;

Fig. 11 is a diagrammatic elevational view of another embodiment of a strut according to the invention, comprising a jack of the double-acting type, mounted upon a central member and actuating the adjacent members by means of a set of links;

Fig. 12 is a like view of a modification;

Fig. 13 shows in elevation a modified construction of an apparatus made according to the invention.

As shown by Fig. 1, the mechanism forming the pivoted frame or strut of a retractable undercarriage for aircraft or the like, comprises three members 1, 2 and 3, juxtaposed to one another and pivotally connected together. Members 1 and 3 are pivoted to the central member at the two ends of the latter, at 4 and 5, respectively. The operating jack 6 is situated between members 1 and 2, and its piston rod 7 is pivoted at 8 to a boss, appendage or the like, 9 of member 1, whilst its cylinder 10 is pivoted at 11 to an appendage 12 of member 3.

The length of the appendages 9 and 12 is so chosen as to provide for a suitable leverage for the transmission of the force supplied by the jaw.

The operation of this device is quite simple: With the mechanism unfolded and being in the position shown in full lines, if it is desired to raise the undercarriage or landing gear or to fold up the said frame, fluid is admitted into the jack, and this will move the piston in the direction of arrow $f^1$. The two members 1 and 3 will pivot about 4 and 5, turning through an angle of about 90°. At this time, they have the position 1'—3' as shown in the dotted lines, whilst jack 6 has been slightly lowered and is now at 6'.

In the case of Fig. 2, the frame comprises, as before, two members 1 and 3, which are pivoted at 4 and 5, respectively, to a third and intermediate or central, member 2. Members 1 and 3 are connected together by a rod or link 13 which is pivotally mounted on said members at 14 and 10, respectively.

Jack 6 is pivoted at 16 to member 1, i. e., its cylinder is rotatable about point 16. Piston rod 7 is pivoted at 8 to the intermediate member 2.

The operation of this device is as follows: When fluid is admitted into jack 6 and moves the piston in the direction of the arrow $f^1$, member 1 will pivot upwardly about point 4, under the effect of the reaction due to the thrust exerted by the piston upon member 2. Member 1 thus turns through an angle of about 90° and comes to 1' (position shown in dotted lines). On the other hand, member 3 is turned by link 13, which now comes to 13', which link, during its movement, pulls member 3 in the direction of arrow $f^2$, thus causing said member to pivot about point 5 and bringing it to position 3'. Thus the whole arrangement, when folded up, will finally occupy the position shown in dotted lines.

This disposition provides for an automatic locking of the members in the unfolded position.

In fact, it is necessary that, when unfolded, an upward movement of member 3, i. e., in the direction of the arrow, should not take place, and especially that it should not cause a corresponding movement of member 1. In order to prevent any such movement, the points 4, 14 and 15 are located in such position that the upward movement of member 3 ($f^2$) will tend to cause the deformation of the device by bringing it into neutral position, i. e., by bringing the points 4, 14 and 15 into line.

This result is obtained by placing the point 14 above the point 4, so that an upward movement of the member 3 will tend to lower the point 14. It should be noted that this locking is not reversible, as the direct action of the jack 6 will apply at 14 a force which is practically perpendicular or very oblique to the broken line 4—14—15, and this is sufficient to cause the deformation of the device.

Fig. 3 relates to an arrangement resembling the one shown in Fig. 1, provided with an elastic reaction device consisting of a strong spring 17, for instance, which is stretched between the members 1 and 2. The points 18 and 19 at which the spring is attached to the respective members 1 and 3, are chosen in such way that the lines 4—18 and 5—19 will be inclined from the vertical line passing through the points 4 and 5. In this manner, the maximum length of the said spring is attained when the device passes through the dead centre. i. e., when the points 18—4—5—19 are in line. In the unfolded position, the length of the spring 17 is only 18'—19', whilst its length at the dead centre is 18''—19'', and is now appreciably greater. It will thus be noted that any unnecessary movement of the members 1 or 3 will only bring the device near the dead centre, and hence this constitutes a very simple automatic locking arrangement.

It is evidently possible to employ a locking device of quite a different type, such as that shown by Fig. 7. In this case the locking device comprises two catches 20 and 21 which are pivoted at 22 and are acted upon by two respective jacks 23 and 24 mounted on member 2. These catches engage in suitable recesses formed in members 1 and 2. These jacks are preferably actuated at the same time as the main jack 6, and they provide for the locking of the jointed device when this latter is unfolded.

Fig. 4 shows a device similar to that of Fig. 2, but which further comprises a shock-absorber inserted between members 1 and 3 and consisting of a piston 25 movable in a cylinder 26 containing air. This cylinder is pivoted to member 5, and the piston rod is pivoted to member 1. The shock-absorber serves chiefly to compensate the errors in the alignment of the device, and it also serves as a means for locking the device in the position of alignment.

Figs. 5 and 6 show a modification which is used chiefly when it is desired to reduce the height of the device when it is folded in the wing of the aeroplane. In this case, two adjacent members are movable with respect to one of the end members.

In the case of Fig. 5, the central member has been replaced by jack 6 and link 13, which move together with member 3, with reference to member 1, and take the position shown in Fig. 6. All of these members can be so constructed that the actual height of the members, in the folded position, will not exceed a predetermined value.

Fig. 8 shows another modification, in which jack 6 has its cylinder, pivoted at 11, upon central member 2, and acts directly upon member 1 through its piston rod 7. Member 3 is actuated, as before, by link 13, which is pivoted at 14 and 15.

Figs. 9 and 10 show an example of application of the mechanism according to the invention to the retractable undercarriage of an aeroplane. Fig. 9 is a view of the mechanism in the unfolded position. In this case, member 1 is pivoted at 27 to the wing 28 of an aeroplane, and member 3 is pivoted at 29 to a strut 30 carrying a wheel 31, while being also pivoted to the wing at 32. It will be readily observed that when the jack 6 is operated, the whole mechanism will be deformed, and will now take the position shown in Fig. 10.

In the case of Fig. 11, the jack 6 is mounted on the central member 2 which is pivoted at 4 and 5 to the lateral members, respectively. This jack, which is double or of the double-acting type, so as to operate upon the two joints 4 and 5 at the same time, comprises two rods 7—7ª, which are connected respectively at 8—8ª to two sets of jointed links. Said links may be actuated by two separate pistons mounted in a single jack cylinder 6, or by a single piston (see also Fig. 12) or by any other means.

The set of links to which rod 7 is pivoted, comprises a bar or link 33 which is pivoted at 8 to rod 7, and at 34 to a second link 35 whose other end is pivoted at 36 to member 1. At a point 37 on link 33, which may be located between the above mentioned points 8 and 34, is pivoted a rod 38 which is pivoted at its other end to a point 39 of the member 2.

Member 1 is further provided with a catch 40 which is pivoted at a stationary point 41 and which is actuated at its other end 42 by a small jack 43 or the like. When member 2 is brought to position 2' (which position is shown by the dotted lines) the catch 40 engages a hook 44 provided upon member 2.

The fluid is supplied to the jack cylinder at 45 or at 46, according as it is desired to unfold or to fold up the structure. The set of links actuating the jointed device is arranged in a similar manner, and it comprises links of the same kind, which are indicated by like reference numerals provided with a digit $a$.

The operation of the device according to Fig. 11 is as follows: When it is desired to bring the pivoted frame herein represented from its folded position (which position, in the case of an aeroplane, corresponds to the retracted position) into the unfolded or landing position, the jack is supplied with fluid at 45, thus moving the pistons respectively in the direction of the arrows $f^1$ and $f^2$. This displacement of the pistons will bring the pivoting points 8—34—37 of bars 33—35—38 to points 8'—34'—37', and said bars will be brought to 33'—35'—38', respectively. Thus member 2 will take position 2', which is shown by the dotted lines in Fig. 11. The links 33ª—35ª—38ª are moved simultaneously and in the same manner by rod 7ª, thus bringing member 3 into line with the members 1 and 2. Catches 40—40ª, which are preferably urged by springs or by like means, will engage hooks 44—44ª, thus holding the frame members 2 and 3 in their respective positions 2' 3', so that they will maintain said frame in the unfolded position and will maintain the undercarriage in the operative position.

In order to fold back the frame, the fluid is supplied to the jack through orifices 46—46ª, thus acting upon both sides of the pistons, and the locking devices 40—44 and 40ª—44ª will now be released. This release may be separately effected by means of jacks 43—43ª which pull upon the points 42—42ᵃ of the said catches, respectively, thus turning these latter and releasing them from the respective hooks 44—44ᵃ. This release may also be effected automatically if jacks 43—43ᵃ are connected to the middle chamber of jack 6. In this latter case, the release will take place without any special control, when the pressure of the fluid used to fold back the said frame is brought upon the said pistons.

It is evident that additional locking means may be provided for securing the folded members, i. e., the undercarriage, in the retracted position.

Length of the bars 33—35—38 and 33ᵃ—35ᵃ—38ᵃ as well as the distance between joints 39—37 and 36—34—8 (39ᵃ—37ᵃ and 38ᵃ—34ᵃ—8ᵃ), may be suitably determined according to the conditions prevailing for each case of utilization, and chiefly in such way that the leverage shall be sufficient for the purpose. It is preferable to employ an arrangement such that the forces required to fold or unfold the frame shall be maximum when the resistances to be overcome are also maximum. In the folded position, bars 38—35 (38ᵃ—35ᵃ), on the contrary to what is shown in the drawings, may have a position in which they are not parallel but are inclined at any suitable angle. In the present case, it will be noted that the mechanism never passes through dead centres, and thus it may be actuated by the controlling device in a reliable manner, in all the positions which it may assume. On the other hand, by a suitable choice of the leverage of the bars or rods of the mechanism, the forces can be transmitted in any desired manner.

It will be observed that this affords a device of a very simple construction and of a minimum size and weight, which will readily correspond to all conditions of use, which result had not hitherto been obtained.

In the construction shown by Fig. 12, the jack comprises a single piston which actuates the two rods 7—7ᵃ at the same time. The arrangement of the jointed links differs from what is shown in Fig. 11, by the fact that the links 38—38ᵃ are eliminated and are replaced by two joints 47—47ᵃ which form part of the member 2 and serve for the pivoting movement of the links 33—33ᵃ. But in this case it is evident that the rods of the pistons 7—7ᵃ must be provided with respective joints 48—48ᵃ, of the ball-and-socket, roller or other type, by which the portions of the said links which are connected at the points 8—8ᵃ of the links 33—33ᵃ, respectively, may follow the circular movements of the points 8—8ᵃ.

The operation of the said device is the same as that of the device shown in Fig. 11. In the case of a jack having a single piston, it will be evidently necessary, as shown in Fig. 12, to employ two sets of links operating upon the joints 4—5 in such way that the movement of the piston in a single direction will effect the folding or the unfolding of the members 2 and 3. Fig. 12 also shows the unfolded position of the frame, in the dotted lines.

In the device shown in Fig. 13, the mechanism comprises three members 1, 2 and 3 which are pivoted together at 4 and 5. The piston of the jack 6 is pivotally mounted at 48 on the member 2, and the piston-rod 7 is pivoted at 49 to a rocking bar 50 turning about a point 50ᵃ of the member 2. One end of said lever is connected by a link 52 to a point 53 of the member 3. The other end 54 of the lever is pivoted by a link 55 at a point 56 of a second rocking bar 57 which turns about a point 57ᵃ of the member 2. The point 56 is connected to a point 58 of the member 1 by a pivoted link 59.

The operation of this device is very simple: When the piston in the jack cylinder moves according to the arrow f³, the lever 50 turns in the direction of the arrow f⁴, thus moving the member 4 which pivots about the point 5. This movement of the lever is transmitted by the link 55 to a rocking bar 57 which turns in the direction of the arrow f⁵ and raises the member 1 by means of the link 59. Thus the members 1 and 3 will both turn upwardly about the points 4 and 5, and hence the undercarriage will be folded back.

Obviously, the pivoted parts of the said apparatus will have such construction that they will not mutually interfere, during their respective movements.

For this purpose, the central member may have the form of a forked bracket, in which the outer members may have a free movement. It is also feasible to bend aside the ends of the outer members in the devices shown in Figs. 1 to 10, in order to prevent any contact with the central member. On the other hand, the members which are pivoted together may be more than three in number, and in such case, it will be simply necessary to provide a separate operating link for each additional member.

Obviously, the invention is not limited to the embodiments herein described and represented, which are given solely by way of example. It is feasible, for instance, without departing from the principle of the invention, to utilize any suitable locking devices, which may or may not be affected by the forces causing the movement of the pivoted parts of the frame. The pivoted parts of the frame may be solid or hollow, and in certain cases, may comprise a suitable place for attaching the jacks or like devices. It should be remarked that it will be of no great importance if one of the members of the pivoted frame should be stationary and should for instance form part of the body of the aeroplane.

Having now described my invention, what I claim as new and desire to secure by Letters Patent is:

1. A jointed mechanism, chiefly adapted for use upon retractable undercarriages of aircraft comprising a folding strut member consisting of at least three main practically equivalent pivoted elements pivotally interconnected, having substantially similar dimensions and adapted to be in alignment upon the unfolding of the mechanism, and a single member such as a jack mounted on said mechanism for controlling the movements thereof, said member being connected to at least two of said main elements and producing their relative displacement.

2. A mechanism according to claim 1, wherein said member is a jack comprising a piston and a cylinder, is situated between two nonadjacent elements, and is independent of the third element, the piston rod of the jack being pivoted to one of the said nonadjacent elements and its cylinder to the other element.

3. A mechanism according to claim 1, further comprising protruding parts provided on said jointed elements, the said jack being adapted to act upon said latter elements on points situated on said protruding parts, and adapted to transmit the forces producing the pivoting effect with a suitable leverage.

4. A mechanism according to claim 1, with the further feature residing in this that said jack is mounted upon one of said jointed elements, and comprises transmission members provided between the directly actuated elements and the other jointed elements.

5. A jointed mechanism, chiefly adapted for use upon retractable undercarriages of aircraft comprising a folding strut consisting of at least three practically equivalent main pivoted elements pivotally interconnected, having substantially similar dimensions, and adapted to be in alignment upon the unfolding of the mechanism, and a single member such as a jack mounted on said mechanism for controlling the movements thereof, said jack being connected to at least two of said main elements and controlling their relative displacements, and further locking means for immobilizing the different elements in the unfolded position.

6. A mechanism as claimed in claim 1, wherein one of the jointed elements is stationary and at least two adjacent elements which are in sequence are adapted to move with respect to it.

JEAN MERCIER.